Patented Jan. 28, 1941

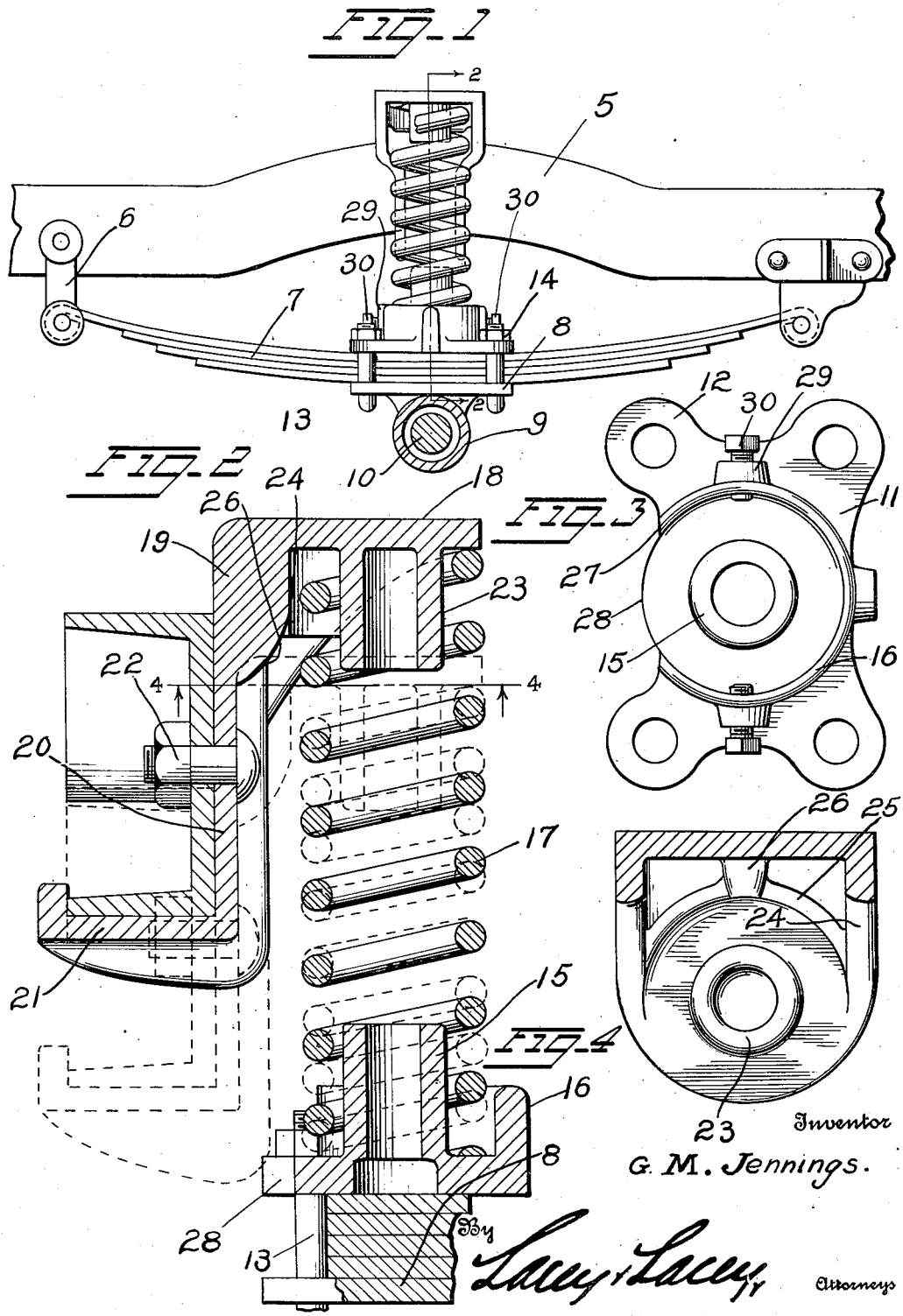

2,229,808

UNITED STATES PATENT OFFICE 2,229,808

CUSHIONING DEVICE FOR MOTOR VEHICLES

Gregory M. Jennings, Evansville, Ind.

Application November 13, 1939, Serial No. 304,239

2 Claims. (Cl. 267—28)

This invention relates to overload cushioning devices for motor vehicles and more particularly to an overload spring especially designed for use in connection with motor trucks and the like.

The object of the invention is to provide an overload spring and mounting therefor of simple and durable construction capable of absorbing all primary and rebound shocks transmitted to a motor truck or other vehicle when traveling over rough uneven roads.

A further object of the invention is to provide an overload spring comprising a base plate and a coacting spring-engaging bracket, said base plate being provided with an upstanding retaining flange having its rear portion cut away to form a channel or guide to accommodate the lower end of the bracket when the spring is compressed due to an overload thereon or incident to vertical vibration of the truck.

A further object of the invention is to provide the overhanging head of the bracket with a centering boss having a segmental flange disposed concentric therewith and connected to the head of the bracket by an integral reinforcing web, said web having its outer edge inclined in the direction of the segmental flange so that should the spring become accidentally displaced due to excessive vibrations or for other reasons, the web will automatically guide the spring back into its seat.

A still further object of the invention is generally to improve this class of devices so as to increase their utility, durability and efficiency.

In the accompanying drawing forming a part of this specification and in which similar numerals of reference indicate corresponding parts in all the figures of the drawing:

Figure 1 is a side elevation of an overload spring embodying the present invention showing the same in position on the chassis of a motor truck, Figure 2 is an enlarged vertical sectional view taken on the line 2—2 of Figure 1 and showing in dotted lines how the lower or angular end of the supporting bracket slides within the guide channel in the base plate when the spring is under excessive compression, Figure 3 is a top plan view of the base plate detached, and Figure 4 is a transverse sectional view taken on the line 4—4 of Figure 2 with the spring removed and looking in the direction of the centering boss of the bracket.

The improved overload cushioning device forming the subject-matter of the present invention is particularly designed for attachment to motor trucks and other heavy duty vehicles, and by way of illustration is shown applied to one of the chassis bars 5 of a motor truck of standard construction. The chassis bar 5 is provided with the usual shackles 6 from which is suspended the main spring 7 resting on a saddle plate 8 carried by the casing 9 of the axle 10.

The improved device comprises a base plate 11 having oppositely disposed pairs of perforated lugs 12 for the reception of U-bolts 13 which latter extend through the saddle plate 8 with their upper ends fitting within the perforations in the lugs 12 for engagement with clamping nuts 14. The central portion of the base plate 11 is provided with an upstanding hollow centering boss 15, and surrounding said boss and disposed concentric therewith is an upstanding flange 16 which serves to prevent displacement of the lower end of a coiled spring 17, the latter being interposed between the base plate 11 and the overhanging head 18 of a supporting bracket 19, as best shown in Figure 2 of the drawing. The bracket 19 is provided with a depending shank 20 terminating in a hooked portion 21 which receives the chassis bar 5, the parts being rigidly secured together by a bolt or similar fastening device 22 extending through the shank 20 and the chassis bar 5 so as to cause the bracket and chassis bar 5 to move in unison. The head 18 of the bracket is provided with a depending centering boss 23 disposed in alinement with the centering boss on the base 11 which bosses project within the adjacent ends of the coiled springs 17. The head 18 is also provided with inclined side flanges 24 and formed integral with said side flanges and spaced from the centering boss 23 is a segmental flange 25 connected with the adjacent wall of the head 18 by a reinforcing web 26. The forward edge of the web 26 is inclined in the direction of the flange 25 and not only serves to reinforce the head 18 but also serves to guide the adjacent end of the spring 17 back into its seat between the flange 25 and centering boss 23 should said spring become accidentally displaced due to excessive vibrations of the truck or the like.

The rear portion of the retaining flange 16 of the base plate 11 is cut away at 27 to form a channel or guide 28 which accommodates the angular portion 21 of the shank 20 when the spring 17 is under compression and thereby allows free vertical movement of the bracket and prevents said bracket from coming in contact with the base plate when the bracket is forced downwardly under the influence of excessive load on the truck. The cut-away portion 27 of the flange 16 not only forms a channel or guide for the bracket but also permits the escape of any moisture which may tend to collect on the base plate around the centering boss thereof. The flange 16 of the base plate is provided with reinforcing bosses 29 in which are threaded clamping screws 30 for engagement with the adjacent convolutions of the spring 17. It will thus be seen that, when the truck is overloaded, the spring 17 will be compressed and the bracket 18 will be forced downwardly to the dotted line position shown in Figure 2 of the drawing, and in which position the lower end of the bracket will enter the guide channel in the base plate. Should the upper end of the coiled spring 17 become displaced from the centering boss 23 on the head 18, the adjacent convolutions of the spring 17 by engagement with the inclined face of the reinforcing web 26 will automatically guide said spring into its seat around the centering boss on the bracket head. While the U-bolts 13 are shown extending upwardly through the saddle plate and base plate 11 for engagement with the clamping nuts 14, it will, of course, be understood that the free ends of the U-bolts may extend downwardly through the openings in the base plate 11 with their lower ends extending through the saddle plate for engagement with suitable clamping nuts if desired.

It will further be understood that the devices may be made in different sizes and shapes and applied to any style or type of vehicle without departing from the spirit of the invention.

Having thus described the invention, what is claimed as new is:

1. A cushioning device for motor vehicles including a base plate having perforated lugs for attachment to a vehicle spring and provided with an upstanding flange having its rear portion cut-away to form a guide channel, said base plate being provided with an upstanding centering boss disposed concentric with the flange, reinforcing bosses formed on said flange and provided with threaded openings, a bracket having a depending shank for attachment to the chassis of the vehicle and movable within the guide channel of the base plate, said bracket being formed with an overhanging head having a depending centering boss and provided with inclined side flanges, a segmental flange connecting the inclined flanges and spaced from the boss and the body plate, a reinforcing web extending between the mid-portion of the segmental flange and body of the bracket and extending across the segmental flange and having its outer face inclined in the direction of said segmental flange, a coiled spring interposed between the base plate and head of the bracket and fitting around the adjacent centering bosses, and clamping screws threaded in the reinforcing bosses on the base plate and engaging the spring.

2. As a new article of manufacture, a supporting bracket for overload springs comprising a body portion having one end thereof provided with a depending shank terminating in a hook and its other end formed with a head disposed at substantially right angles to said body portion and provided with a hollow depending centering boss, said head being formed with inclined side flanges connecting the head with the body of the bracket and provided with a segmental flange disposed at the rear of the boss and spaced therefrom to form a seat for a coiled spring, and a reinforcing web connecting the central portion of the segmental flange with the body of the bracket between said inclined flanges and having its outer face inclined upwardly in the direction of said segmental flange.

GREGORY M. JENNINGS.